United States Patent [19]

Connell

[11] 4,072,028
[45] Feb. 7, 1978

[54] INDEXING COUPLING

[75] Inventor: David G. Connell, Milwaukee, Wis.

[73] Assignee: The Falk Corporation, Milwaukee, Wis.

[21] Appl. No.: 715,682

[22] Filed: Aug. 19, 1976

[51] Int. Cl.² .............................................. F16D 3/66
[52] U.S. Cl. ...................................... 64/24; 64/15 R
[58] Field of Search ................ 64/9 R, 24, 15 R, 1 C; 192/55; 74/339, 340, 815

[56] References Cited

U.S. PATENT DOCUMENTS

| 3,246,483 | 4/1966 | Schmitter | 64/15 R |
| 3,247,734 | 4/1966 | Africano | 64/24 |

FOREIGN PATENT DOCUMENTS

| 260,814 | 11/1926 | United Kingdom | 64/24 |

Primary Examiner—Benjamin W. Wyche
Assistant Examiner—R. C. Turner
Attorney, Agent, or Firm—Quarles & Brady

[57] ABSTRACT

A flexible coupling is formed by a pair of hubs adapted for mounting on a pair of shafts and interconnected by a flexible serpentine grid. One of the hubs is formed as an indexing assembly including an outer hub member having a first series of internal gear teeth, an inner hub member journaled in the outer hub member and having a second series of external gear teeth of a different count, and an indexing ring having external and internal gear teeth that mate with the respective first and second series of teeth. The indexing ring is removable axially from between the inner and outer hub members so that the inner hub member and the shaft upon which it is mounted can be rotated relative to the outer hub member. The indexing ring is then reinserted. When fully assembled, an end ring seals the mating teeth and defines a lubricant reservoir for the mating teeth.

1 Claim, 4 Drawing Figures

INDEXING COUPLING

BACKGROUND OF THE INVENTION

This invention relates to shaft couplings, and more particularly to a flexible coupling having provision for adjustment of the relative rotational position of the shafts being connected.

It is common to employ flexible couplings to connect shafts in drive trains so that parallel, angular, and axial misalignments can be accommodated. The flexible couplings may also provide torsional flexibility for dampening shock loads. Two common forms of flexible couplings are the gear tooth coupling and the flexible grid coupling. Both forms use a pair of hubs, one of which is mounted on each of the shafts being coupled. In the gear tooth coupling, a sleeve having internal gear teeth mates with external gear teeth formed on the hubs. In the flexible grid type, a serpentine grid has its parallel rungs received in axially directed slots formed in the hubs. An example of the latter form of flexible coupling is found in U.S. Pat. No. 3,079,773 issued Mar. 5, 1963 to Walter P. Schmitter for "Coupling."

At times it is necessary that the shafts being coupled be capable of being rotationally positioned relative to each other. On example is found where two drive trains, driven from a common source, are connected to a pair of rolls which require synchronization. Another example is found where there is a common load, such as a ball mill, which is driven from two prime movers and it is either necessary or desirable to be able to divide the load equally by fine adjustment of one or the other drive trains.

In either case, with the standard flexible coupling of either the gear or flexible grid type, it is necessary to rotationally align the shafts prior to the completion of installation of the coupling. Even then the degree of alignment which is possible is dependent on the pitch of the mating gear teeth in a gear coupling or the angular distance between consecutive slots in a flexible grid coupling. Such positioning allows only relatively course alignment.

The present invention provides a flexible coupling which permits extremely fine adjustment between the rotational positions of the shafts being coupled.

SUMMARY OF THE INVENTION

In accordance with the invention there is provided a flexible coupling in which one of the two hubs coupled together is formed of an inner hub member adapted to be mounted on one of the shafts and having a series of external teeth, an outer hub member coaxial with and spaced from the inner hub member and having a series of internal teeth of a different number than the external teeth of the inner member, and an intermediary member having internal and external teeth which mate with the respective series of teeth of the inner and outer hub members.

Further in accordance with the invention the external teeth of the inner hub member and the internal teeth of the outer hub member are radially aligned and the intermediary comprises a ring, which can be slid axially between the inner and outer hub members.

The indexing hub of the coupling may be mounted on either the driving shaft connected to the prime mover or on the driven shaft connected to the load depending upon which is most easily rotated relative to the other and depending further on the particular purpose to be served by the indexing. Indexing is accomplished by axially withdrawing the indexing ring and rotating the indexing ring relative to the inner hub. Then the outer hub and all parts connected to it are rotated relative to the indexing ring, and the indexing ring is replaced in new tooth locations thereby effectively rotatively displacing the inner and outer hub members relative to each other. The degree of rotational repositioning which is possible is dependent upon the number of teeth provided in the two series of teeth and the total possible positions is a product of the two numbers of teeth. The numbers of teeth in the two series are so selected that they do not have common factors to thereby provide the maximum number of tooth positions and the smallest increment of indexing.

It is a principal object of this invention to provide a flexible coupling having provision for very fine adjustment of the relative rotational positions of the shafts which it connects. It is a further object to provide such an indexible flexible coupling which is capable of transmitting substantial torque loads.

The foregoing and other objects and advantages of the invention will appear in the detailed description which follows. In the description reference is made to the accompanying drawings which illustrate a preferred embodiment of the invention.

DETAILED DESCRIPTION OF THE PREFERRED EMBODIMENT

Figure 1:
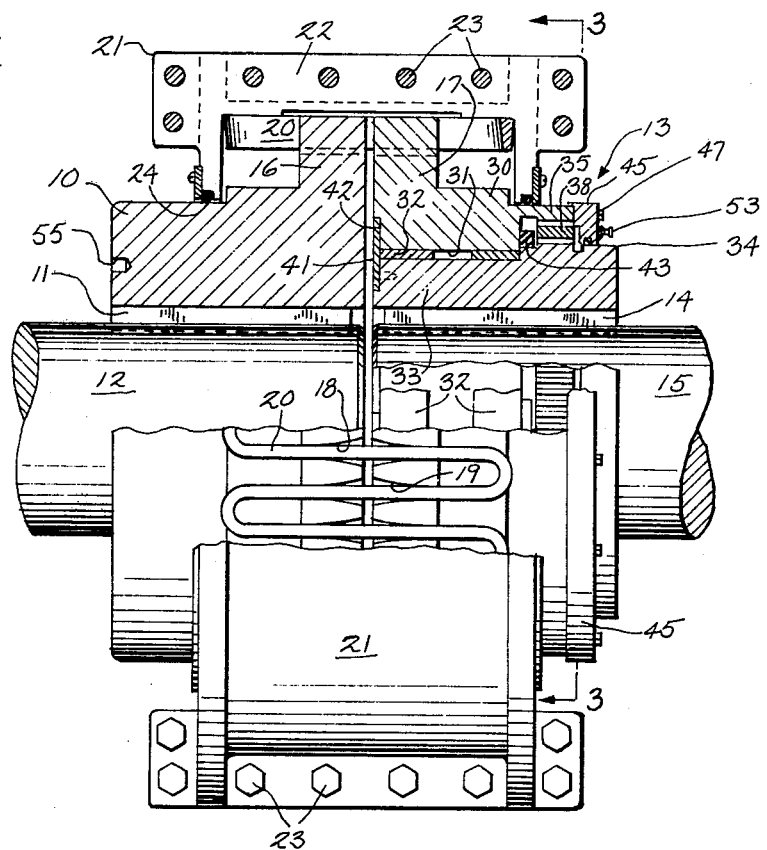
FIG. 1 is a side view in elevation and partially in section of an indexing coupling in accordance with the present invention.
Figure 2:
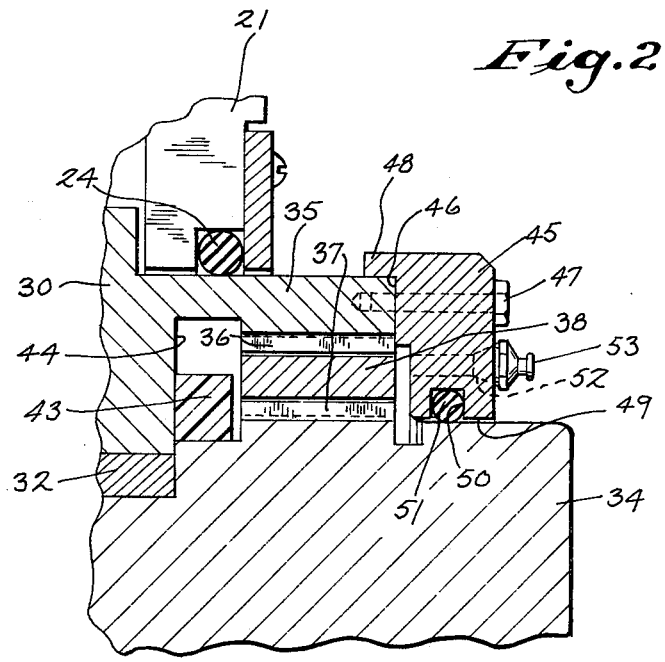
FIG. 2 is a view in vertical section of a portion of the coupling of FIG. 1 and drawn on an enlarged scale to better illustrate the cooperating elements of the indexing hub.
Figure 3:
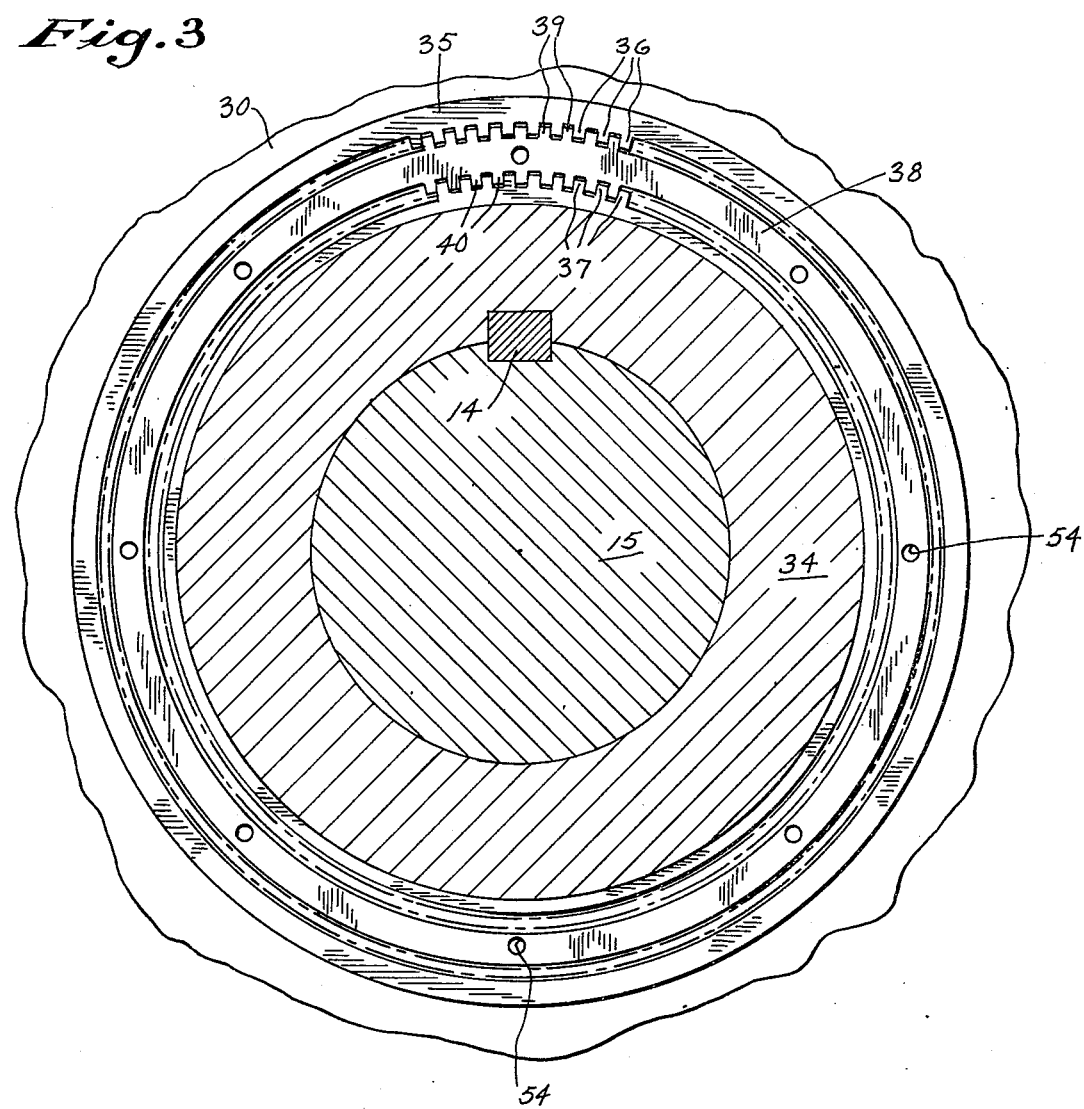
FIG. 3 is a view in vertical section taken in the plane of the line 3—3 of FIG. 1.

Referring to the drawings, and particularly to FIG. 1, the indexing coupling is illustrated as being of the flexible grid type disclosed in the aforementioned U.S. Pat. No. 3,079,773. That is, a hub 10 is connected by a key 11 to a first shaft 12, and a second hub, which in the present invention is a hub assembly 13, is connected by a key 14 to the second shaft 15. Both of the hubs 10 and 13 are provided with a respective flange portion 16 and 17 peripherally disposed about the portion of the hub adapted to be placed in facing relationship with the adjacent hub. The flanges 16 and 17 are each provided with a series of axially directed slots 18 and 19 respectively, which receive the straight rung portions of a serpentine flexible grid 20. The grid and interconnected flanges 16 and 17 are enclosed by a lubricant retaining cover 21 formed of a pair of semi-circular cover halves which include end plates 22 which are joined together by a plurality of bolts 23. Radially inwardly extending sides of the cover 21 mount O-rings 24 which seal about peripheries of the hubs 10 and 13. Lubricant under pressure is supplied to the interior of the cover 21 to lubricate the interconnecting grid 20 and slots 18 and 19.

As can be seen in FIG. 1, the grid 20 is tapered in cross section and the slots 18 and 19 are similarly tapered. Furthermore, the slots 18 and 19 flare in an axial direction. In a known manner, the coupling is capable of accommodating parallel misalignment between the shafts 12 and 15 by movement of the grid 20 in the lubricated slots 18 and 19. The same ability to move accommodates angular misalignment by permitting rocking and sliding actions of the grid 20 in the slots 18 and 19. Axial misalignment is similarly accommodated by permitting the grid 20 to slide axially within the slots 18 and 19. The flared sides of the slots 18 and 19 permit relative rotation of the two hubs under torsional load to thereby provide torsional flexibility in the coupling to dampen and absorb normal, shock and vibratory loads. What has been described thus far is known to the art of flexible grid couplings.

According to the present invention one of the hubs 13 is formed as an indexing assembly. Specifically, the flange 17 with the slots 19 is formed at one end of an outer hub member 30. The outer hub member 30 includes an inner bore 31 which extends for a major portion of its length from its axially innermost end. The inner bore 31 receives a pair of axially spaced bronze sleeve bearings 32. The sleeve bearings 32 receive a circular cylindrical mounting portion 33 of an inner hub member 34 which is keyed to the shaft 15.

The outer hub member 30 is also provided with an axially extending sleeve portion 35 at its outermost end. The sleeve portion 35 has a first series of axially extending gear teeth 36 formed on its inner periphery. The first series of gear teeth 36 are radially aligned with and confront a second series of axially extending gear teeth 37 which are formed on an external periphery of the inner hub member 34. The first series of gear teeth 36 have a different number of teeth than the second series of gear teeth 37, and preferably the first series of teeth 36 is greater in number. Also, the two series of teeth 36 and 37 should not have common mathematical factors. An indexing ring 38 has external gear teeth 39 which mate with the first series of gear teeth 36 of the outer hub member 30, and further has internal gear teeth 40 which mate with the second series of teeth 37 on the inner hub member 34. The teeth of the indexing ring are preferably coextensive in axial length with the first and second series of teeth 36 and 37, respectively.

The inner and outer hub members 34 and 30, respectively, are located axially with respect to each other by a disc-like keeper plate 41 attached to the axially innermost face of the inner hub member 34 and received in a recess 42 formed in the similar face of the outer hub member 30. This prevents axial movement in one direction. Axial movement in the opposite direction is restrained by an annular flexible spacer 43 received in an annular space defined between the ends of the gear teeth 37 of the inner hub member 34 and a wall 44 formed in the outer hub member 30.

Following assembly of the hub 13, the space occupied by the mating gear teeth of the inner and outer hub members 34 and 30, respectively, and of the indexing ring 37, is closed by an end ring 45. The end ring 45 has a face 46 disposed against the axially outermost face of the sleeve portion 35 of the outer hub member 30 and is secured thereto by bolts 47 which extend through the end ring 45 and into threaded bores in the sleeve portion 35. An axially extending lip 48 surrounds the outer periphery of the sleeve portion 35. A central bore 49 of the end ring 45 contains an annular recess 50 which mounts an O-ring 51 that seals against the outer perimeter of the inner hub member 34.

The end ring 45 is also provided with diametrically opposed axial openings 52 which receive standard lubrication fittings 53 through which a lubricant, such as grease, can be admitted to lubricate the meshing gear teeth 36, 37, 39 and 40. The end ring 45, together with the spacer 43, also function to axially restrain the indexing ring 37 between the inner and outer hub members 34 and 30, respectively.

A coupling in accordance with this invention may find particular use, for example, in a drive for a ball mill. That is, a pair of pinions are employed to drive a ring gear attached to the ball mill and each pinion is driven by a synchronous electric motor. In order to divide the load as evenly as possible between the two synchronous motors, it is desirable to be able to adjust to a find degree the rotational alignment of each motor rotor to its stator. Accordingly, the indexing coupling of this invention would be employed in one of the drive trains to one of the pinions. The shaft 15, which is the driven shaft, would either mount or be connected to one of the pinions. The shaft 12, which is the driving shaft, would be connected to the synchronous motor shaft. In assembling the coupling, the hub 10 would first be placed upon and keyed to the driving shaft 12, the end ring 45 would be hung upon the driven shaft 15, and then the hub assembly 13 would be mounted on and keyed to the driven shaft 15. After coarse rotational alignment of the driving shaft 12 with respect to the driven shaft 15 is achieved, the serpentine grid 20 would be assembled to connect the two hubs 10 and 13 and the cover 21 would be placed upon the assembled hubs.

To change the relative angular position of the driving shaft 12 to the driven shaft 15, the indexing ring 38 is withdrawn axially and rotated relative to the shaft 15 and its attached inner hub member 34. Then the assembled outer hub 30, cover 21, grid 20, hub 10 and driving shaft 12 would be rotated relative to the indexing ring 38. Once the desired angular positioning has been achieved, the indexing ring 38 is reinserted between the inner and outer hubs. The indexing ring 38 is provided with a number of equally spaced tapped openings 54 which can receive threaded eye bolts or other attachments to facilitate the axial withdrawal of the indexing ring 38. The outer face of the hub 10 is also provided with bores 51 which can receive pins and a bar to apply torque to the hub 10 and the attached driving shaft 12 to rotate the same during the adjustment operation.

The coupling of this invention is capable of very small increments of indexing. The smallest increment is determined by the number of teeth in both the first and second series of teeth 36 and 37. For example, in a coupling in which the outer series contains 157 teeth and the inner series contains 143 teeth, the minimum degree of indexing is about 0.016° of arc (i.e., 360° divided by the product of 157 teeth times 143 teeth). Greater or lesser increments of indexing could be provided by changing the number of teeth in the two series, so long as the number is different between the two series and the two numbers of teeth do not have common factors.

After indexing has been achieved to provide the fine adjustment of the angular orientation of the driving shaft 12 with respect to the driven shaft 15, the end ring 45 may be mounted in place and lubrication introduced through the fittings provided therein. Should it be necessary to readjust or re-index the coupling it is necessary only to remove the end ring 45 and withdraw the index ring 37. The other parts of the hub assembly 13 need not be removed in making an indexing adjustment.

Figure 4:
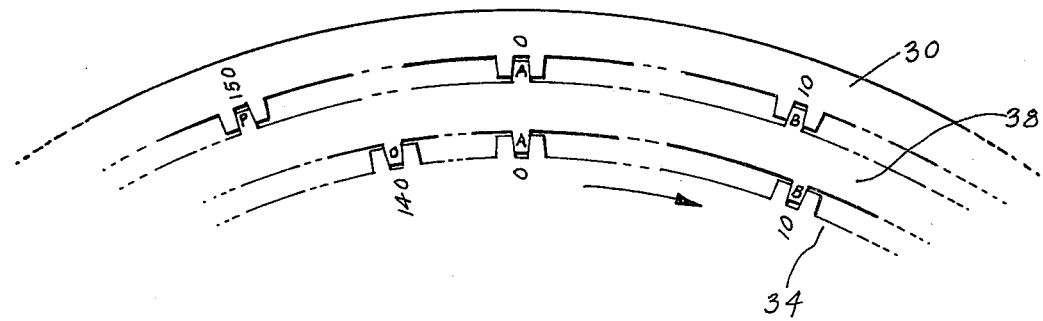
FIG. 4 is a schematic view of the mating series of teeth and illustrating their relationship.

Referring to FIG. 4, the series of mating gear teeth may advantageously be provided with indicia to assist in the indexing operation. Thus, the external and internal gear teeth 39 and 40, respectively, of the indexing ring 38 may be provided with letter markings on every tenth tooth (for example) and the external series of gear teeth 37 on the inner hub member 34 together with the internal gear teeth 36 on the outer hub member 30 may be provided with numerical markings at each 10th root between teeth in a clockwise direction.

The gear tooth form used in the indexing coupling is preferably the same as that commonly used for splines and gear couplings. Since all of the mating teeth 36, 37, 39 and 40 are in contact at all times, there is a large total area through which torque loads can be transmitted and the indexing coupling, although capable of fine adjustment, is able to transmit very large torque lodes.

The coupling has been illustrated as being incorporated in a flexible grid type coupling. The indexing hub could, instead, be advantageously applied to a gear or other type flexible coupling. That is, for example, one of the two hubs of the coupling could be formed similar to the indexing hub 13 except that the flange 17 of the outer hub member 30 would be provided with a series of external gear teeth which would mate with a sleeve having internal gear teeth, in a known manner.

I claim:

1. In a flexible coupling for connecting a pair of axially aligned shafts, which coupling includes a pair of hubs each adapted to be mounted on one of said shafts and each including axially directed slots which receive a flexible grid element which couples the hubs together, the improvement wherein one of said hubs comprises:

an inner hub member adapted to be secured to one of said shafts and including a circular cylindrical mounting portion extending from its axially innermost end, and a first series of axially extending gear teeth formed on an external periphery;

an outer hub member which includes said axially directed slots engaged by said grid element, said outer hub member having a central bore extending from its axially innermost end and a sleeve portion projecting axially from its opposite end, said mounting portion of said inner hub member being journaled within said central bore and said sleeve portion having a second series of axially extending gear teeth formed on an internal periphery and which are spaced from and radially aligned with said first series, the number of teeth in said second series being different from the number of teeth in said first series;

an indexing ring axially slidable between said inner and outer hub members and having internal and external gear teeth which mate with said first and second series of gear teeth;

an end ring connectable to the end of said sleeve portion and overlying the ends of the mating series of gear teeth to prevent removal of said indexing ring;

a keeper plate secured to the axially innermost end of said inner hub member and overlying said axially innermost end of said outer hub member, and an annular spacer disposed in an annular space defined between an intermediate radial wall of said outer hub member and the inner ends of said second series of gear teeth.

* * * * *